United States Patent
Schmatz et al.

(10) Patent No.: US 10,986,021 B2
(45) Date of Patent: Apr. 20, 2021

(54) FLOW MANAGEMENT IN NETWORKS (71) Applicant: International Business Machines Corporation, Armonk, NY (US)

(72) Inventors: Martin Schmatz, Rueschlikon (CH); Mitch Gusat, Langnau (CH); Alexander T. Iannicelli, Andover, MA (US); Akos Mate, Rüschlikon (CH)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 15/913,330

(22) Filed: Mar. 6, 2018

(65) Prior Publication Data
US 2019/0280978 A1 Sep. 12, 2019

(51) Int. Cl.
| | |
|---|---|
| *H04L 12/40* | (2006.01) |
| *H04L 12/801* | (2013.01) |
| *H04L 12/813* | (2013.01) |
| *H04L 12/947* | (2013.01) |

(Continued)

(52) U.S. Cl.
CPC .............. *H04L 47/12* (2013.01); *H04L 47/20* (2013.01); *H04L 49/25* (2013.01); *H04L 12/4013* (2013.01); *H04L 29/0604* (2013.01); *H04L 67/2828* (2013.01)

(58) Field of Classification Search
CPC .......... H04L 47/12; H04L 47/20; H04L 49/25
See application file for complete search history.

(56) References Cited

U.S. PATENT DOCUMENTS

| 8,824,294 B2 | 9/2014 | Halabi et al. |
| 9,231,876 B2 | 1/2016 | Mir et al. |
| 9,544,233 B2 | 1/2017 | Ansari et al. |

(Continued)

FOREIGN PATENT DOCUMENTS

| WO | WO2008148122 A2 | 12/2008 |
| WO | WO2012130264 A1 | 10/2012 |
| WO | WO2017199208 A1 | 11/2017 |

OTHER PUBLICATIONS

Duato et al., "A New Scalable and Cost-Effective Congestion Management Strategy for Lossless Multistage Interconnection Networks", Proceedings of the 11th International Symposium on High-Performance Computer Architecture, San Francisco, CA, Feb. 12-16, 2005.

(Continued)

*Primary Examiner* — Moo Jeong
(74) *Attorney, Agent, or Firm* — Scully, Scott, Murphy & Presser, P.C.; Daniel Morris, Esq.

(57) ABSTRACT

Methods and apparatus are provided for managing data flows in a switch connected in a network. Such a method includes monitoring a set of data flows traversing the switch for compliance with a predetermined resource-usage policy, and, in response to detection of a non-compliant data flow, mirroring a set of data packets of that flow to send respective mirror packets to a mirror port of the switch. The method further comprises using the mirror packets sent to the mirror port to construct a non-compliance notification for the non-compliant flow, and sending the non-compliance notification into the network. The resource-usage policy can be defined such that the switch is operable to send a non-compliance notification before occurrence of congestion due to the non-compliant flow.

21 Claims, 3 Drawing Sheets

(51) Int. Cl.
    *H04L 29/06*     (2006.01)
    *H04L 29/08*     (2006.01)

(56) References Cited

U.S. PATENT DOCUMENTS

| | | | |
|---|---|---|---|
| 9,544,239 B2 | 1/2017 | Gafni et al. | |
| 2007/0183332 A1* | 8/2007 | Oh | H04L 47/10 |
| | | | 370/236 |
| 2015/0103659 A1* | 4/2015 | Iles | H04L 47/26 |
| | | | 370/235 |
| 2015/0124619 A1 | 5/2015 | Bergamasco et al. | |
| 2015/0195293 A1* | 7/2015 | Kamble | H04L 63/1408 |
| | | | 726/22 |
| 2016/0057065 A1* | 2/2016 | Briscoe | H04L 47/624 |
| | | | 370/235 |
| 2018/0091388 A1* | 3/2018 | Levy | H04L 41/0213 |
| 2019/0182161 A1* | 6/2019 | Ravi | H04L 47/12 |

OTHER PUBLICATIONS

Santos et al., "Evaluation of Congestion Detection Mechanisms for InfiniBand Switches", Internet Systems and Storage Laboratory, HP Laboratories Palo Alto, HPL-2002-224, Aug. 13, 2002, IEEE Globecom 2002, Nov. 17-21, 2002, Taipei, Taiwan.

International Search Report dated Apr. 4, 2019, received from the European Patent Office.

* cited by examiner

FLOW MANAGEMENT IN NETWORKS

BACKGROUND

The present invention relates generally to flow management in networks, and more particularly to management of data flows in network switches to inhibit network congestion.

Current network switches may implement various techniques associated with controlling congestion in a network. At a basic level, switches typically employ some form of AQM (Active Queue Management) system to monitor the status of queues in switch buffers and selectively drop data packets when necessary. Packets may be dropped if a queue is full, for example, or may be dropped on a probabilistic basis in dependence on average queue lengths according to a RED (Random Early Detection) algorithm or variant thereof. Packet-drops result in loss of data or, if dropped packets can be detected by network protocols, re-sending of the packets, with adverse implications for network efficiency (protocol overhead, increased latency and multiple sends which might cause congestion elsewhere in the network). Switches may also employ control mechanisms which operate at Layer 2 of the OSI (Open Systems Interconnection) model. These link-level mechanisms, such as Ethernet Pause Frame, PFC (Priority-based Flow Control), PCIe (Peripheral Component Interconnect Express) credits, etc., aim to control flow of packets into the switch on Layer 2 links to manage congestion in the switch. These mechanisms can propagate back-pressure to upstream nodes. Blocked "hot" data flows can prevent other "cold" flows from advancing via HOL (Head-of-Line) blocking. A single hotspot can, in extreme cases, cause global collapse of network throughput.

Some switches implement more elaborate congestion control schemes which operate at higher OSI layers. In ECN (Explicit Congestion Notification) enabled networks, for example, switches can mark (rather than drop) packets in response to congestion, e.g. via a RED scheme, to set a flag (ECN codepoint) in the packet. This flag is detected by the destination node (receiver) of the packet and echoed back to the source node (transmitter) which can then throttle the offending data flow, e.g. by reducing its congestion window as for a packet drop. ECN and other elaborate congestion control mechanisms, such as DCTCP (Data Center Transmission Control Protocol) and QCN (Quantized Congestion Notification) aim to control data flows at their source to address congestion on a global basis. However, these schemes can be complex and are restricted in their application. They require handling at upper OSI layers and only operate with specific protocols that support their implementation.

Improvements in mechanisms for managing data flows in networks would be highly desirable.

SUMMARY

According to at least one embodiment of the present invention there is provided a method for managing data flows in a switch connected in a network. The method includes monitoring a set of data flows traversing the switch for compliance with a predetermined resource-usage policy, and, in response to detection of a non-compliant data flow, mirroring a set of data packets of that flow to send respective mirror packets to a mirror port of the switch. The method further comprises using the mirror packets sent to the mirror port to construct a non-compliance notification for the non-compliant flow, and sending the non-compliance notification into the network.

Methods embodying the invention offer an elegantly simple and practical mechanism providing the basis for effective global flow control in a network. The basic operating principles are protocol agnostic, and can be employed in any switch at any OSI layer. Moreover, methods embodying the invention can exploit standard functionality, widely available in switches, to implement functions required for operation of the method. Mirroring functionality, for example, is standard in most current switches. Unlike conventional use of mirrors, however, the mirroring function is triggered in response to detection of a non-compliant flow, and the mirror packets are used to construct the non-compliance notification which is sent into the network. Since mirroring involves creating copy (mirror) packets, the original, mirrored packets remain in the data flow and continue on in the network. However, the non-compliance notification allows the wider network to adapt as required to inhibit non-compliance with the resource-usage policy of the switch. This can be done without affecting the original data flows with packet-loss or delay.

The resource-usage policy applied by the switch can be defined as desired for data flows in a network. By appropriate setting of policy constraints, non-compliance notifications can be sent to enable an early response to potential congestive conditions. In particularly advantageous embodiments, therefore, the resource-usage policy is defined such that the switch is operable to send the non-compliance notification before occurrence of congestion due to the non-compliant flow. A non-compliance notification then provides an early warning of potential congestion due to the non-compliant flow, allowing the network to adapt to inhibit congestion and hence potential packet drops. This provides a simple, practical system providing the basis for global end-to-end lossless network operation. Moreover, since the mirroring operation does not affect packets in the monitored data flows, the scheme can be implemented on top of existing flow/congestion control mechanisms, providing a predictive derivate component of an existing PID (Proportional-Integral-Derivative) control loop used for congestion control.

The resource-usage policy may define, for each of a plurality of subsets of the monitored set of data flows, at least one resource-usage limit for that subset, this limit being less than a maximum permitted value for that subset. Such a maximum permitted value may be predetermined based on available resources such as buffer capacities and/or bandwidth, and requirements for servicing data flows, to ensure that service requirements can be met for all flows. This provides a convenient system for early/predictive notification of potential congestion, and can be readily implemented by exploiting standard filtering/policer tools in switches.

An above-mentioned resource-usage limit may comprise a flow rate for example. Such a flow-rate limit can be imposed as a shadow flow rate for a maximum-permitted (target) rate for a flow or flows, and compliance can be conveniently monitored by a policer implementing a token bucket algorithm. A resource usage limit may alternatively comprise a queue occupancy threshold for example. Such a limit can be imposed as a phantom queue occupancy threshold, and compliance can be conveniently monitored by a policer implementing a leaky-bucket algorithm.

A non-compliance notification may comprise at least one routable data packet, including an identifier indicative of the non-compliance notification, which is preferably addressed to a network node upstream in the non-compliant flow. Addressing the packet to an upstream node permits a fast response in the network. Such a routable data packet may also mimic a packet of another congestion control scheme, e.g. an ECN-marked packet, so as to exploit existing congestion management mechanisms and provide an early warning of congestion. Ideally, a routable data packet can be addressed to a source node of the non-compliant flow in the network. This allows the source to react quickly, e.g. to throttle the flow. The network can respond faster than with existing flow control schemes, e.g. avoiding the RTT (round-trip-time) delay associated with conventional ECN. Such a routable data packet can also be generated in a simple manner from a mirror packet by interchanging a source address and a destination address in the mirror packet and setting the identifier indicative of the non-compliance notification, e.g. an ECN flag.

Respective further embodiments of the invention provide a network switch adapted to implement a method for managing data flows described above, and a network comprising a plurality of such switches.

Embodiments of the invention will be described in more detail below, by way of illustrative and non-limiting example, with reference to the accompanying drawings.

DETAILED DESCRIPTION

Figure 1:
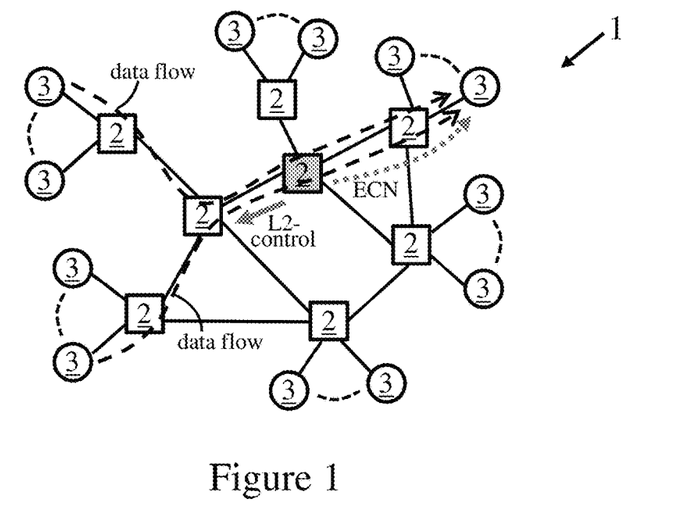
FIG. 1 is a schematic illustration of a network.

FIG. 1 is a simple schematic of an exemplary data communications network 1 comprising a plurality of switches 2 interconnecting a plurality of edge nodes 3. Each switch 2 has a plurality of ports for connection to physical links (which may in general include wired and/or wireless links) via which the switch is connected to its neighboring switches 2 and/or edge nodes 3. A data flow in network 1 may traverse one or more switches en route between the source and destination nodes of the flow, and each switch 2 is able to process multiple flows (e.g. many thousands of flows) concurrently during network operation. Each switch 2 processes data packets of inbound flows arriving at its ports and forwards the packets to the appropriate ports for ongoing transmission towards their destination nodes via outbound links.

Congestion may occur at any point in the network if demand for processing packets exceeds the available processing resources. As a simple illustration, a congested switch 2 processing packets from two data flows between edge nodes 3 is shown shaded in the figure. To control congestion, the switch may employ a link-level (Layer 2) flow control mechanism, indicated by the solid arrow in the figure, to manage transmission of incoming packets from the upstream node on a Layer 2 (L2) link. In addition, where supported by higher-layer protocols, the switch may mark packets to provide a congestion notification which is ultimately relayed back to the source of the data flow. In the example here, as indicated by the dashed arrow in the figure, the congested switch 2 can mark packets according to an ECN scheme. The ECN-marked packets are detected by the destination node 3 of a congestive flow which then relays the congestion notification back to the source node in known manner. The source node can then reduce its congestion window to throttle the offending flow. In addition to such conventional congestion control mechanisms, one or more switches 2 of network 1 can implement a data flow management method described below. In preferred embodiments of network 1, all switches 2 are adapted to implement this data flow management method.

Figure 2:
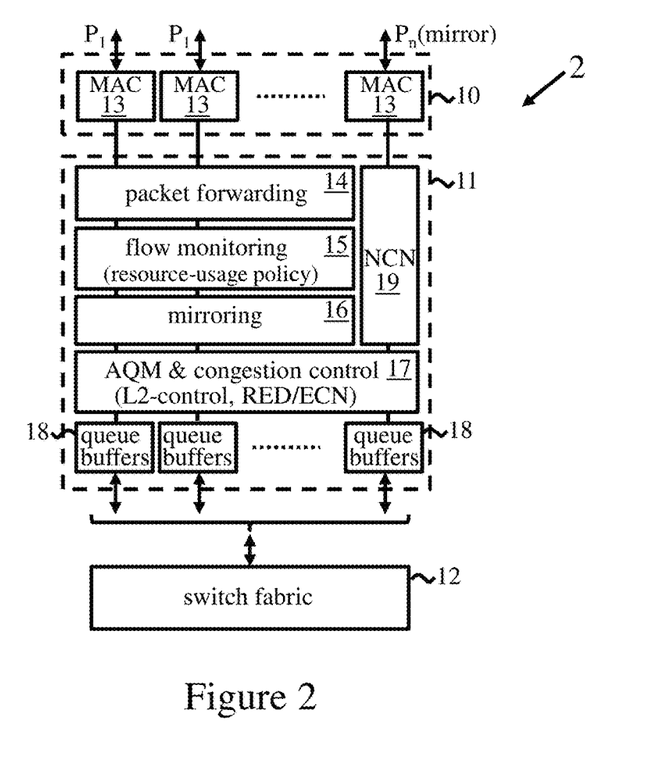
FIG. 2 is a schematic representation of a network switch embodying the invention.

FIG. 2 is a schematic block diagram of an exemplary embodiment of switch 2 showing basic elements involved in operation of the switch and implementation of the data flow management method detailed below. The switch 2 has a plurality of ports, indicated at $P_1$ to $P_n$, for connection to network links, and comprises an I/O (input/output) stage 10, packet processing logic 11 and switch fabric 12. At least one switch port, in this example port $P_n$, is a designated (typically dedicated) mirror port. A typical switch may have, for example, 1 to 8 such mirror ports for network monitoring purposes. In the present case, however, mirror port $P_n$ is used for the flow management scheme described below.

I/O stage 10 comprises a MAC (Media Access Control) unit 13 for transmission/reception of data at each port, and may perform additional functions associated with QoS (Quality of Service) processing, data encryption/decryption, etc. Packets arriving at a switch port are passed by the MAC unit in I/O stage 10 to packet processing logic 11. This includes a packet forwarding module (or "forwarding engine") which performs address lookups and makes forwarding decisions for packets at each port to determine the appropriate output ports to which packets should be relayed for onward transmission in the network. Packet processing logic 11 also includes a module 15 comprising flow monitoring logic which provides functionality for monitoring data flows as detailed below based on a predetermined resource-usage policy stored in module 15. Processing logic 11 further includes standard mirroring logic 16, and an AQM & congestion control module 17 which manages queues of data packets in a set of queue buffers 18 connected to switch fabric 12 of the switch. In particular, incoming packets at a switch port are queued in one or more (real or virtual) queues in buffers 18 associated with that port pending transfer via switch fabric 12 to buffers associated with their outbound ports, where the packets are again queued pending processing by the outbound port MAC units.

Control module 17 includes logic implementing conventional Layer 2 congestion control as described above. Depending on the particular network and switch implementation, such a Layer 2 control mechanism may comprise, for example, Ethernet flow control such as Pause Frame, PFC or SPFC (Selective PFC), or PCIe credits, IB (InfiniBand) credits, FC (Fibre Channel) credits, or OP (OmniPath) credits. Control module 17 may also implement functionality for higher-layer flow control mechanisms e.g. ECN or variants thereof such as DCTCP (Data Center Transmission Control Protocol) marking or RoCE (Remote Direct Memory Access over Converged Ethernet) marking, QCN, IB CCA (InfiniBand Congestion Control Annex), etc., where supported by upper-layer protocols in network 1. In the example shown, module 17 implements ECN based on RED marking as described earlier.

Packet processing logic 11 also includes notification logic in the form of NCN (non-compliance notification) module 19 which is associated with mirror port $P_n$. In particular, the NCN module here is connected to the MAC unit of mirror port $P_n$ and provides functionality for generating non-compliance notifications as described in detail below.

In general, network 1 may implement a variety of network protocols which operate at different layers of the OSI model and switch 2 may incorporate functionality for operation at any OSI layer. Switch 2 may therefore comprise a Layer 2 or higher-layer switch and may implement a router, bridge or gateway, for instance, or any other device providing switching functionality in a network. In general, functionality of modules 14 through 19 may be implemented by hardware or software or a combination thereof. For example, functionality may be implemented by software modules executable by one or more processors which may be provided on one or more ASICs (Application-Specific Integrated Circuits), FPGA's (Field-Programmable Gate Arrays), microcontrollers, microcode, firmware, etc., of switch 2. Functionality implemented in software may be provided by a soft switch, SDN (Software-Defined Networking) switch, vSwitch, etc. Functionality of one or more modules may be wholly or partially combined, and switch 2 may include additional functionality orthogonal to the flow management method to be described, e.g. additional packet processing engines for switch/network-specific functionality, and a central control unit for controlling operation of processing modules generally.

Network 1 may comprise any type of data processing/communications network, such as a local or wide-area network, datacenter network, cloud network, distributed processing network, VM (Virtual Machine) network, static or ad hoc wireless network, IoT (Internet of Things) network, etc., and may in general comprise one or more component networks and/or internetworks, including the Internet.

Edge nodes 3 may comprise, for example, general or special-purpose computers, servers, processors, NICs (Network Interface Controllers), VMs, Hypervisors, VFs (Virtual Functions), SoCs (System on Chips), applications, etc., or any other (real or virtual) networked entity.

Depending on the particular application, data packets processed by switch 2 may comprise packets of data defined for any network protocol at any OSI layer, and may correspond to a frame, segment, packet, datagram, etc., as defined by any given protocol.

In operation of switch 2, the flow-monitoring module 15 monitors a set of data flows traversing the switch for compliance with the predetermined resource-usage policy. While the monitored set of data flows may in general comprise one or more flows, more typically hundreds or thousands of flows may be monitored. The resource-usage policy may specify resource-usage constraints for individual flows or groups of flows, e.g. flows from and/or to particular source/destination nodes in network 1. For some applications, all flows handled by the switch may be monitored. In others, only selected flows, e.g. "hot" or potentially congestive flows, may be monitored. Resource usage constraints may be specified in terms of buffer occupancy levels, e.g. number of packets in buffers 18 at a switch port, and/or bandwidth consumed by flows in terms of packet processing rates e.g. packet-rate or bit-rate for packets arriving at a switch port.

Figure 3:
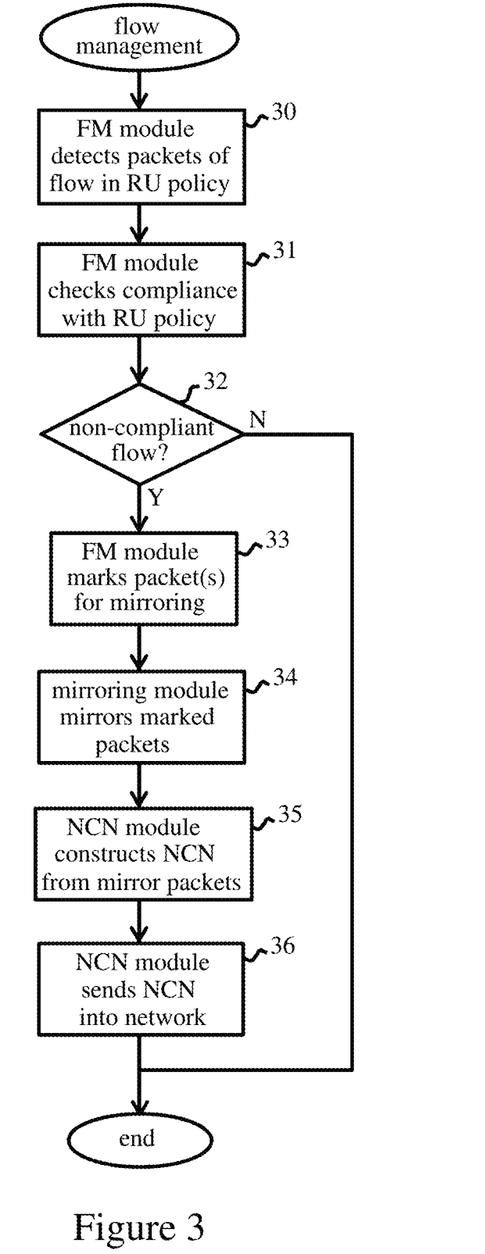
FIG. 3 shows steps of a method for managing data flows performed by the switch of FIG. 2.

FIG. 3 indicates basic steps of the flow management method performed by switch 2. Data packets received by the switch are processed by forwarding engine 14 and queued in buffers 18 as described above. The flow-monitoring (FM) module 15 monitors packets sent by the forwarding module 14 to buffers 18 at each port to detect packets of monitored flows (i.e. flows specified in the resource-usage (RU) policy) as indicated at step 30. On detection of a monitored flow, in step 31 FM module 15 checks whether the flow is non-compliant with the resource-usage policy. If not, as indicated by a "No" (N) at decision block 32, then no action is required and the process terminates. If the flow is non-compliant with the policy ("Yes" (Y) at decision block 32), then in step 33 the FM module marks a set of (one or more) packets of the flow for mirroring by setting a mirror flag in the packet. (Here, only a current packet may be marked for mirroring or, for example, a mirror flag may be set in any packets, or sampled packets, of the flow which are received within a predetermined interval of detecting a non-compliant flow or which are already queued in buffers 18 for the port). In step 34, mirroring module detects and mirrors marked packet(s) in the usual way, generating respective copy (mirror) packets to be sent to the mirror port $P_n$ of the switch. The mirror packets are forwarded to mirror port $P_n$ via queue buffers 18 and switch fabric 12 in the usual way. The original, mirrored data packets are similarly forwarded to the appropriate outgoing ports for onward transmission in the flow. In step 35, NCN module 19 receives the set of mirror packets sent to mirror port $P_n$ and uses the mirror packets to construct a non-compliance notification for the non-compliant flow. The non-compliance notification comprises one or more routable data packets which include an identifier indicative of the non-compliance notification. This can be constructed in various ways using the mirror packets as discussed further below. In step 36, the NCN module sends the non-compliance notification into the network via mirror port $P_n$, and the process is complete for the current non-compliant flow.

The above process provides a simple, practical and universally applicable (protocol agnostic) mechanism which can be employed in any switch, at Layer 2 or higher, as a basis for global flow control in a network. The principles are independent of networking standards and transport protocols, and can operate with Ethernet, InfiniBand, Omnipath, NVlink, etc., networks and TCP (Transmission Control Protocol), UDP (User Datagram Protocol), VPN (Virtual Private Network) tunnels, overlays, RDMA (Remote Direct Memory Access), etc., as required. Non-compliance notifications can be generated by mirroring packets without affecting the original data flows, whereby the scheme can be employed on top of conventional congestion/flow control mechanisms provided in the switch. Flow-monitoring and non-compliance notification can be implemented for multiple virtual flows through the switch, offering the speed of Layer 2 flow control with the resolution of Layer 4 transports (per flow or group of flows), avoiding HOL blocking. Moreover, the resource-usage policy can be readily defined to provide early notification of potential congestive conditions, whereby the network can respond to inhibit occurrence of congestion and consequent packet loss. Exemplary implementations of such an early congestion notification scheme will now be described in more detail.

In the embodiments which follow, the resource-usage policy in FM module 15 is defined such that the switch is operable to send a non-compliance notification before occurrence of congestion due to a non-compliant flow. In particular, the policy can be defined such that a non-compliance notification will typically be sent before activation of standard congestion management mechanisms in switch 2. In this example, the early congestion notification mechanism can be activated before Layer 2 flow control and ECN marking is required. The set of monitored data flows ideally comprises all flows handled by the switch, or at least all flows which may give rise to potentially-congestive conditions. For each of a plurality of subsets of the data flows, the resource-usage policy defines at least one resource-usage limit for that subset. Each subset here may in general comprise one or more flows, e.g. a flow between a particular source and destination node pair, or all flows from/to a particular source/destination node or set of nodes. For each subset, the resource-usage limit is set at a value which is less than (e.g. 0.5% to 10% less than) a maximum permitted value for that subset. The maximum permitted value in each case may be determined based on various switch/network parameters such as buffer capacities, bandwidth availability and service requirements for flows, e.g. QoS requirements, speed, delay, priority, etc., to ensure that flows can be appropriately accommodated. Such maximum, or target, values may be calculated in a variety of ways for a given network, e.g. by a network controller (not shown in FIG. 1) using an algorithm for shared resource utilization. The target values, and corresponding resource-usage limits for flows, may be predefined for a given network, or may be dynamically updated. FM module 15 may therefore be preconfigured with static resource-usage policy for a particular network, or the policy may be dynamically determined, e.g. at runtime or periodically by a network controller, and supplied to switch 2 for application in a given period.

Figure 4:
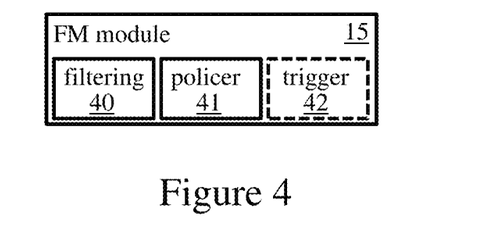
FIG. 4 shows a more detailed schematic of flow monitoring logic in an embodiment of the FIG. 2 switch.

The preferred embodiments here exploit standard functionality which is widely available in network switches to implement the FM logic 15 of switch 2. FIG. 4 shows a more detailed schematic of FM module 15 in these embodiments. The FM module comprises a filtering module 40, a policer module 41 and, optionally for some implementations below, a trigger module 42. Filtering module 40 is implemented as a set of ACL (Access Control List) rules. ACLs, commonly employed in switches, define a set of condition:action type rules, and are used here to identify packets of the monitored flows and forward the packets to policer module 41. Policer module 41 implements a plurality of policers. One policer is provided for each subset of the monitored data flows, i.e. each flow or group of flows, for which a resource-usage limit is specified in the RU policy. Each policer checks for non-compliance with the resource usage constraint (i.e. whether the resource-usage limit is exceeded) and performs a specified action, here marking or dropping packets, in the case of non-compliance. Trigger module 42 operates as described further below in the event that the policer action is to drop packets.

Figure 5:
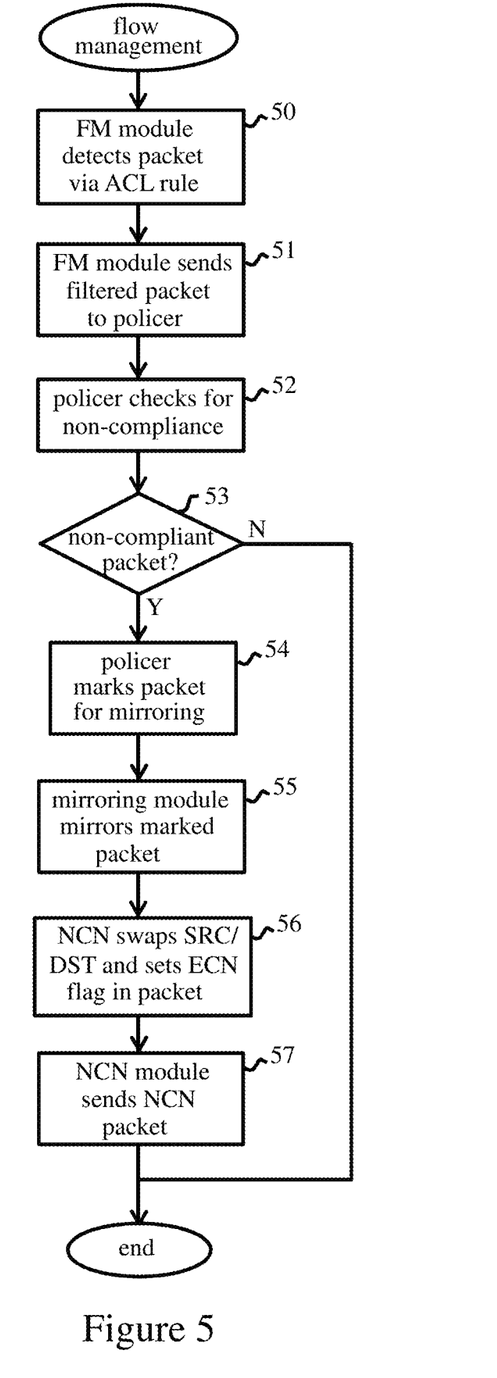
FIG. 5 indicates steps of a flow management method employing the flow monitoring logic of FIG. 4.

FIG. 5 indicates basic steps of a first flow management method using the FIG. 4 FM module without trigger module 42. Filtering module 40 monitors packets arriving at each switch port and checks the packet header information against all ACL rule conditions. Rule conditions specify packet header information (e.g. source and/or destination node addresses) corresponding to monitored flows. On detecting a packet satisfying a rule condition as indicated at step 50, in step 51 the filtering module forwards the packet to the particular policer of module 41 specified in the rule action, e.g. ACL rule (condition="dstIP"=="ExampleIP", action=p1), sends a packet with a destination IP address equal to "ExampleIP" to a policer "p1" of module 41. In step 52, the receiving policer checks the packet for compliance with the specified resource-usage limit. Particular implementations of this step are described further below. If the packet is compliant (No at decision block 53, no further action is required). If the packet is deemed non-compliant (Yes at decision block 53), then in step 54 the policer marks the packet for mirroring. In step 55, mirroring module 16 detects the mirror flag and creates a mirror packet which is forwarded to mirror port $P_n$. In step 56 here, NCN module 19 receives the mirror packet and generates a non-compliance notification at line speed by interchanging the source address SRC and destination address DST in the mirror packet, and setting the ECN flag in the packet. The resulting NCN packet thus comprises a routable data packet which is addressed to the source node of the non-compliant flow and in which the ECN flag serves as the non-compliance indicator for the packet. However, since the packet is generated based on a resource-usage limit which is less than the target value for the flow, the NCN packet is generated early, before the flow causes congestion and before activation of the conventional ECN marking mechanism in switch 2. The NCN packet thus provides an early ECN notification, hereinafter "EECN packet", which is sent directly to the source of the offending flow. NCN module 19 sends the EECN packet via mirror port $P_n$ in step 57, and the process is complete.

The above process provides an efficient and practical mechanism for early notification of potential congestive conditions, operating on top of existing L2 and ECN control mechanisms in the switch. The EECN packet exploits the standard ECN marking mechanism, but the packet is relayed directly to the source node, providing fast, early notification of potential problems. The source node can thus react quickly to adapt the flow to inhibit non-compliance with the RU policy of the switch, e.g., to reduce its congestion window in the usual way. The system thus provides stable and scalable closed-loop congestion control in which transient bursts can be absorbed in local switch buffers and congestion is pushed to the edge of the network. Resource-usage limits are enforced in switches with zero packet drops, and hot traffic is mirrored as feedback via EECNs. By early response to EECNs at source nodes, global lossless operation can be achieved in network 1.

Figure 6:
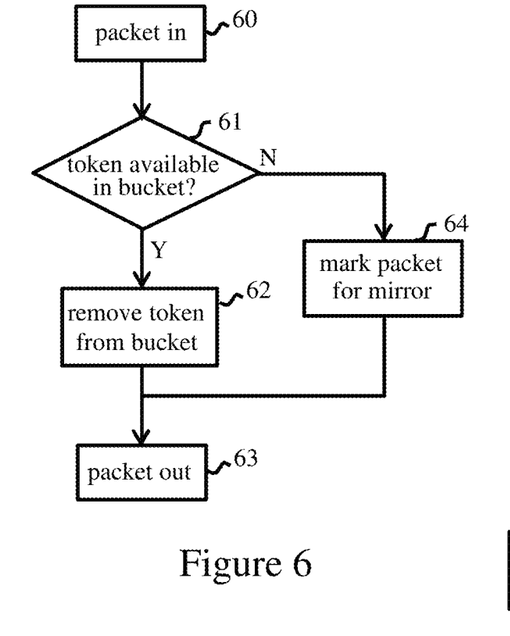
FIG. 6 indicates packet processing steps in an embodiment of the FIG. 5 method.

FIG. 6 indicates packet processing steps in one implementation of a policer for use in the FIG. 5 method. In this example, the resource-usage limit applied by the policer comprises a flow rate. This is defined as a shadow flow rate which is less than the maximum-permitted (target) rate for the flow, and is implemented via a token bucket algorithm in policer module 41. Tokens are supplied to the bucket at the specified shadow flow rate until the bucket fills up. The FIG. 6 process corresponds to steps 52 to 54 in FIG. 5. A packet (selected by an ACL rule in step 50 of FIG. 5) is received by the policer in step 60. In decision step 61, the policer determines if the bucket contains any tokens. If so, a token is removed in step 62, and the packet is output in step 63. If the bucket is empty in step 61, then the policer marks the packet for mirroring in step 64, and the marked packet is output in step 63.

Figure 7:
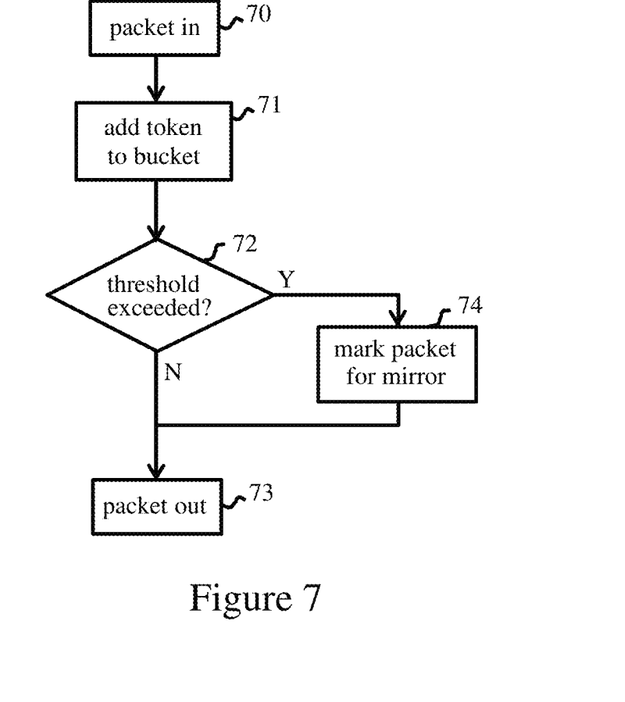
FIG. 7 indicates packet processing steps in another embodiment of the FIG. 5 method.

FIG. 7 indicates packet processing steps in an alternative policer implementation. Here, the resource-usage limit applied by the policer comprises a queue occupancy threshold. This is defined as a phantom queue occupancy threshold for a phantom queue which is serviced at the target rate for the flow, and is implemented via a leaky bucket algorithm in policer module 41. Tokens are removed ("leak") from the bucket at the target service rate, and the queue occupancy threshold is set to a level less than the capacity of the bucket. A packet is received by the policer in step 70 and a token is added to the bucket in step 71. In decision step 72, the policer determines if the threshold has been crossed. If not, the packet is output in step 73. If the threshold is crossed, the policer marks the packet for mirroring in step 74, and the marked packet is output in step 73.

In a modification to the FIG. 7 operation, instead of using a hard threshold for marking all packets, a probabilistic marking scheme may be employed, e.g. RED marking, whereby packets are marked with increasing probability as the level of tokens in the bucket increases above a basic threshold level.

In some switches such as Intel Corporation's RRC (Red Rock Canyon) switches, policer functionality can only mark packets to be dropped (and not mirrored). In this case, trigger module 42 can be employed in FM module 15. Here, policers can operate generally as described above, but set the drop flag in packets when a resource-usage limit is exceeded. Trigger module 42 implements a conditions: actions type rule which can be defined to detect the drop flag set by a policer. If the drop flag is detected in a packet, the trigger module clears the drop flag and sets the mirror flag. This virtual drop, or drop/undrop action, allows the required packets to be mirrored as before.

It will be appreciated that many changes and modifications can be made to the exemplary embodiments described above. For example, NCN packets may be addressed to a network node other than the source node, e.g. a node upstream from switch 2 in a non-compliant flow, and may exploit existing control mechanisms other than ECN marking. For instance, coarser local flow control can be achieved by exploiting L2 control mechanisms for NCNs. As an example, NCNs may be generated by determining from mirror packets the next L2 node upstream in the non-compliant flow, and sending a pause frame, PFC frame, SPFC frame, credit cancellation etc., to that node as an NCN.

In general, nodes receiving a NCN can respond in various ways depending on the particular control mechanisms exploited. For example, nodes may respond by pausing or throttling flows, or implementing load balancing, rate limiting, traffic shaping or adaptive routing techniques, etc., to inhibit further non-compliance. Early NCNs can also be based on upper layer control mechanisms other than, or on addition to, ECN, e.g. (DC)TCP, IB CCA, QCN, or RoCE schemes, whereby multiple classes of lossless feedback can be implemented with lossless operation achieved with best practices from these schemes.

NCN packets can be generated in a variety of ways from mirror packets, and may comprise routable data packets of any network protocol, e.g. Ethernet frames/packets, IP packets, etc., depending on implementation. NCN packets may be generated 1:1 from mirror packets or 1:N by processing/compressing N mirror packets, or as a vector of N mirror packets. NCN packets may be created directly from mirror packets or using only selected information from packets, e.g. address information to determine source/upstream nodes. NCN identifiers may in general comprise any flag or marker which identifies the packet as belonging to a NCN.

While operation with a single mirror port $P_n$ is described above, one or more mirror ports may be used for generating NCNs. Embodiments may also be envisaged in which NCN module 19 is provided in a unit of switch 2 connected externally of the mirror port(s) receiving mirror packets generated by the scheme.

In some embodiments, NCN packets may be addressed to a network controller in network 1, e.g. an SDN controller, OpenStack controller in a cloud computing network, a hypervisor controlling a VM network, etc. Such a controller may then implement flow control on a global basis in the network. In other embodiments, NCN module 19 may create from each NCN data packet a copy packet addressed to a network controller, and send the copy packet into the network. The network controller can then monitor flows globally, and modify network parameters if required.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing data flows in a switch connected in a network, the method comprising:
monitoring a set of data flows traversing the switch for compliance with a predetermined resource-usage policy;
in response to detection of a non-compliant data flow, mirroring a set of data packets of that flow by generating respective mirror packets, and sending the mirror packets to a mirror port of the switch;
using the mirror packets sent to the mirror port to construct a non-compliance notification for the non-compliant flow at line speed, said non-compliance notification comprising at least one routable data packet including an identifier flag indicative of the non-compliance notification, said routable data packet produced from a mirror packet of the mirror packets by:
interchanging a source address and a destination address in the mirror packet; and
setting said identifier flag indicative of the non-compliance notification; and
sending the routable data packet into the network before occurrence of congestion due to the non-compliant data flow as defined by the resource-usage policy.

2. The method as claimed in claim 1 wherein said resource-usage policy defines, for each of a plurality of subsets of said set of data flows, at least one resource-usage limit for that subset, said limit being less than a maximum permitted value for that subset.

3. The method as claimed in claim 2 wherein said at least one resource usage limit comprises a flow rate.

4. The method as claimed in claim 2 wherein said at least one resource usage limit comprises a queue occupancy threshold.

5. The method as claimed in claim 1 wherein said routable data packet is addressed to a network node upstream in said non-compliant flow.

6. The method as claimed in claim 5 wherein said routable data packet is addressed to a source of said non-compliant flow.

7. The method as claimed in claim 1 wherein said identifier comprises an ECN flag.

8. The method as claimed in claim 1 wherein said routable data packet is addressed to a network controller in said network.

9. The method as claimed in claim 5 including creating from said routable data packet a copy packet addressed to a network controller in said network, and sending the copy packet into the network.

10. The method as claimed in claim 1 wherein said non-compliance notification comprises said at least one routable data packet which is addressed to a network node upstream in said non-compliant flow and which includes an identifier indicative of the non-compliance notification.

11. The method as claimed in claim 10 wherein said routable data packet is addressed to a source of said non-compliant flow.

12. The method as claimed in claim 11 wherein said identifier comprises an ECN flag.

13. The method as claimed in claim 1, wherein said at least one routable packet is generated in 1:N correspondence by compressing N mirror packets, or is generated as a vector of N mirror packets.

14. A switch having a plurality of ports for connection in a network, the switch comprising:
   a memory storage device for storing program instructions in a non-transitory media;
   one or more hardware processors communicatively coupled to said memory storage device, the one or more hardware processors running the program instructions for configuring the one or more hardware processors to:
   monitor a set of data flows traversing the switch for compliance with a predetermined resource-usage policy;
   in response to detection of a non-compliant data flow, mirror by mirroring a set of data packets of that data flow by generating respective mirror packets and send the mirror packets to a mirror port of the switch; and
   use the mirror packets of the mirror packets sent to the mirror port to construct a non-compliance notification for the non-compliant data flow at line speed, said non-compliance notification comprising at least one routable data packet including an identifier flag indicative of the non-compliance notification, said routable data packet produced from a mirror packet of the mirror packets by:
   interchanging a source address and a destination address in the mirror packet; and
   setting said identifier flag indicative of the non-compliance notification, and to send the routable data packet into the network before occurrence of congestion due to the non-compliant flow as defined by the resource-usage policy.

15. The switch as claimed in claim 14 wherein said resource-usage policy defines, for each of a plurality of subsets of said set of data flows, at least one resource-usage limit for that subset, said limit being less than a maximum permitted value for that subset.

16. The switch as claimed in claim 15 wherein said one or more hardware processors is further configured to: detect packets of said set of data flows, and police compliance with said resource-usage limit for each said subset.

17. The switch as claimed in claim 14 wherein said one or more hardware processors is further configured to: address said routable data packet to a source of said non-compliant data flow in said network.

18. The switch as claimed in claim 14, wherein said at least one routable packet is generated in 1:N correspondence by compressing N mirror packets, or is generated as a vector of N mirror packets.

19. A network having a plurality of switches for communicating data flows between source and destination nodes, connected in the network, for said flows, wherein each switch comprises a switch having a plurality of ports for connection in the network, the switch comprising:
   a memory storage device for storing program instructions in a non-transitory media;
   one or more hardware processors communicatively coupled to said memory storage device, the one or more hardware processors running the program instructions for configuring the one or more hardware processors to:
   monitor a set of data flows traversing the switch for compliance with a predetermined resource-usage policy;
   in response to detection of a non-compliant data flow, mirror by mirroring a set of data packets of that flow by generating respective mirror packets and send the mirror packets to a mirror port of the switch; and
   use the mirror packets sent to the mirror port to construct a non-compliance notification for the non-compliant flow at line speed, said non-compliance notification comprising at least one routable data packet including an identifier flag indicative of the non-compliance notification, said routable data packet produced from a mirror packet of the mirror packets by:
   interchanging a source address and a destination address in the mirror packet; and
   setting said identifier flag indicative of the non-compliance notification, and to send the routable data packet into the network before occurrence of congestion due to the non-compliant flow as defined by the resource-usage policy.

20. The network as claimed in claim 19, wherein said at least one routable packet is generated in 1:N correspondence by compressing N mirror packets, or is generated as a vector of N mirror packets.

21. A network comprising a plurality of edge nodes and a plurality of switches for communicating data flows between the edge nodes, wherein:
   each switch having a plurality of ports for connection in the network, the switch further comprising:
   one or more hardware processors configured to: to monitor a set of data flows traversing the switch for compliance with a predetermined resource-usage policy, said predetermined resource-usage policy defined such that the switch is operable to send a non-compliance notification before occurrence of congestion due to a non-compliant data flow;
   in response to detection of the non-compliant data flow, mirror by mirroring a set of data packets of the non-compliant data flow by generating respective mirror packets and send the mirror packets to a mirror port of the switch; and
   use the mirror packets sent to the mirror port to construct said non-compliance notification for the non-compliant data flow at line speed, and to send the non-compliance notification into the network, said non-compliance notification comprising at least one routable data packet constructed at line speed including an identifier indicative of the non-compliance notification and said one or more hardware processors further adapted to address said routable data packet to a source of the non-compliant data flow in said network; and
   at each edge node, in response to receipt from a switch of a non-compliance notification for the non-compliant data flow, one or more hardware processors configured to adapt the non-compliant data flow to inhibit non-compliance with the resource-usage policy of the switch.

\* \* \* \* \*